L. M. GILCHRIST.
NUT LOCK.
APPLICATION FILED JUNE 17, 1908.

915,343.

Patented Mar. 16, 1909.

Witnesses:
E. F. Stewart
R. M. Elliott

Inventor,
Luther M. Gilchrist.
By C. A. Snow & Co.
Attorneys.

THE NORRIS PETERS CO., WASHINGTON, D. C.

UNITED STATES PATENT OFFICE.

LUTHER M. GILCHRIST, OF HENDERSON, KENTUCKY, ASSIGNOR OF ONE-HALF TO ARCH EYANSON, OF HENDERSON, KENTUCKY.

NUT-LOCK.

No. 915,343.  Specification of Letters Patent.  Patented March 16, 1909.

Application filed June 17, 1908. Serial No. 439,048.

*To all whom it may concern:*

Be it known that I, LUTHER M. GILCHRIST, a citizen of the United States, residing at Henderson, in the county of Henderson and State of Kentucky, have invented certain new and useful Improvements in Nut-Locks, of which the following is a full, clear, and exact description, such as will enable those skilled in the art to which it appertains to make and use the same, reference being had to the accompanying drawings, forming a part of this specification.

This invention relates to nut locks.

The object of the invention is to provide a simple and efficient article of this character which, in a positive manner and without injury to the bolt threads, will prevent a nut from working loose from a bolt or other article upon which it is threaded.

With the above and other objects in view, as will appear as the nature of the invention is better understood, the same consists in the novel construction and combination of parts of a nut lock, as will be hereinafter fully described and claimed.

Figure 1:
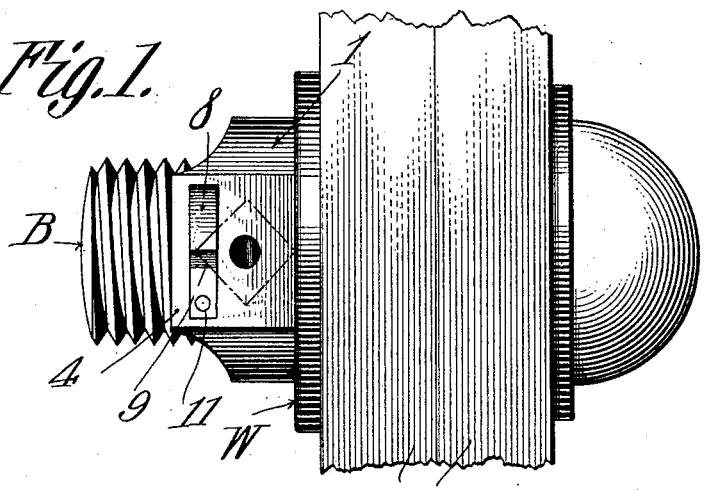
Figure 2:
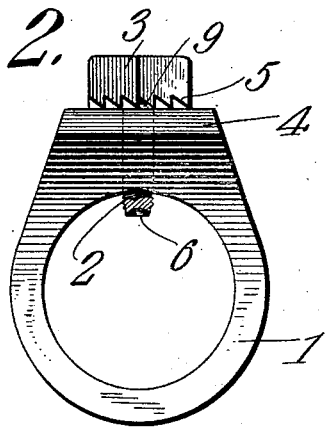
Figure 3:
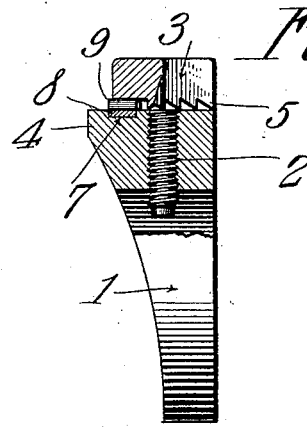
Figure 4:
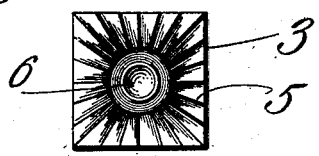
Figure 5:

In the accompanying drawings forming a part of this specification, and in which like characters of reference indicate corresponding parts:—Figure 1 is a plan view showing a pair of plates assembled with a bolt equipped with the nut lock of the present invention. Fig. 2 is a front elevation of the nut lock, a part being in section. Fig. 3 is a view in side elevation, partly in section, of the nut lock. Fig. 4 is an inverted plan view of the set screw. Fig. 5 is a perspective detail view of one of the elements used in connection with the nut lock.

The nut lock comprises an annulus 1 and a set screw having a threaded shank 2 and a head 3, the annulus being provided on its periphery with a flat lateral offset 4 into which is threaded the shank 2. The object of providing the offset is to permit the employment of a relatively thin annulus, and yet to furnish sufficient metal to throw the head of the set screw far enough to one side of the flat face of the annulus to allow the former readily to be turned without contacting with the washer W, as shown in Fig. 1, wherein two plates P are displayed as connected by a bolt B and the nut lock. The annulus is exhibited as secured upon the bolt B, but the latter is not furnished with a nut, and in order to seat the annulus properly upon the bolt with this arrangement, a nut is used which will force the annulus against the object to be secured, after which the set screw is tightened, and the nut may then be removed.

The head of the set screw is, in this instance, quadrangular, and is provided on its under face with saw-tooth shaped teeth 5 which radiate from the center of the head. In order to adapt the inner end 6 of the set screw to sink into a bolt, shaft, or other object with which the device is combined, it is cupped, thereby providing a cutting edge 6 which will sink into the object a sufficient depth to hold the annulus in position. The annulus is provided with a transverse seat 7 which extends throughout a greater portion of the width of the offset 4, as shown in Fig. 1, and in this seat is disposed a spring locking dog 8 provided intermediate of its ends with a saw-tooth shaped lug 9, that is adapted to interlock with any one of the teeth on the head of the set screw when the latter has been properly seated. As shown in Fig. 5, the dog is longitudinally bowed and is provided at one end with an orifice 10 to receive a rivet 11, by which it is secured to the annulus.

I claim:—

A nut lock embodying a substantially annular member provided on its periphery with a flat lateral offset having a transverse seat, a spring member secured in the seat and provided with a saw-tooth shaped lug, and a set screw having its shank threaded into the offset and furnished with a cupped terminal, and its head formed on its under side with teeth to engage with the lug.

In testimony that I claim the foregoing as my own, I have hereunto affixed my signature in the presence of two witnesses.

LUTHER M. GILCHRIST.

Witnesses:
H. M. POLLARD,
A. EYANSON.